(12) United States Patent
Knees et al.

(10) Patent No.: US 8,005,932 B2
(45) Date of Patent: Aug. 23, 2011

(54) NETWORK DISCOVERY

(75) Inventors: Max C. Knees, Fort Collins, CO (US);
Eric Pulsipher, Fort Collins, CO (US);
Gabriel Wechter, Fort Collins, CO (US); Kevin N. Smith, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2639 days.

(21) Appl. No.: 10/716,605

(22) Filed: Nov. 20, 2003

(65) Prior Publication Data
US 2005/0125518 A1    Jun. 9, 2005

(51) Int. Cl.
*G06F 15/173* (2006.01)
*H04L 12/28* (2006.01)

(52) U.S. Cl. ........................ 709/223; 370/254

(58) Field of Classification Search ............. 709/223; 370/254
See application file for complete search history.

(56) References Cited

U.S. PATENT DOCUMENTS

| | | | | |
|---|---|---|---|---|
| 5,850,397 A | * | 12/1998 | Raab et al. | 370/400 |
| 2003/0043820 A1 | * | 3/2003 | Goringe et al. | 370/400 |

OTHER PUBLICATIONS

"Topology Discovery for Large Ethernet Networks". Lowekamp, Bruce, et al. SIGCOMM'01, ACM.*
"An Algorithm for Automatic Topology Discovery of IP Networks" Lin et al. IEEE, 1998.*
Infoplease.com. "set, in mathematics: Defintion of Sets—Infoplease. com" Retrieved Jul. 30, 2008 from "http://www.infoplease.com/ce6/sci/A0861027.html".*

* cited by examiner

*Primary Examiner* — Larry Donaghue

(57) ABSTRACT

A method for discovering a network comprising network devices, the method including dividing the network into zones of network devices, in a zone of the network, identifying devices in the zone that have SNMP (Simple Network Management Protocol) access, collecting data from those devices in the zone identified as having SNMP access, and stitching the collected data into a topology of the network. A machine readable medium a computer program for causing a computing device to perform the exemplary method. A system for discovering a network organized into zones of network devices includes means for identifying devices in a zone of the network that have SNMP access, collecting data from those devices in the zone identified as having SNMP access, and stitching the collected data into a topology of the network, and means for transferring data to and from the means for identifying, collecting and stitching.

17 Claims, 4 Drawing Sheets

NETWORK DISCOVERY

BACKGROUND

A known solution for discovering a network, for example a managed network, collected data from all managed nodes in the network and then processed all of the collected data. When a managed network contains a sufficiently large number of managed nodes, bulk discovery of the nodes can increase the memory resident size of the central discovery process beyond resources of the system hosting the central discovery process.

SUMMARY

A method for discovering a network comprising network devices, includes dividing the network into zones of network devices, and in a zone of the network, identifying devices in the zone that have SNMP (Simple Network Management Protocol) access, collecting data from the identified devices, and stitching the collected data into a topology of the network. A machine readable medium can include software or a computer program or programs for causing a computing device to perform the exemplary method. An exemplary system for discovering a network organized into zones of network devices includes means for identifying devices in a zone of the network that have SNMP access, collecting data from those devices in the zone identified as having SNMP access, and stitching the collected data into a topology of the network, and means for transferring data to and from the means for identifying, collecting and stitching.

BRIEF DESCRIPTION OF THE DRAWINGS

The accompanying drawings provide visual representations which will be used to more fully describe the representative embodiments disclosed herein and can be used by those skilled in the art to better understand them and their inherent advantages. In these drawings, like reference numerals identify corresponding elements and.

DETAILED DESCRIPTION

Figure 1:
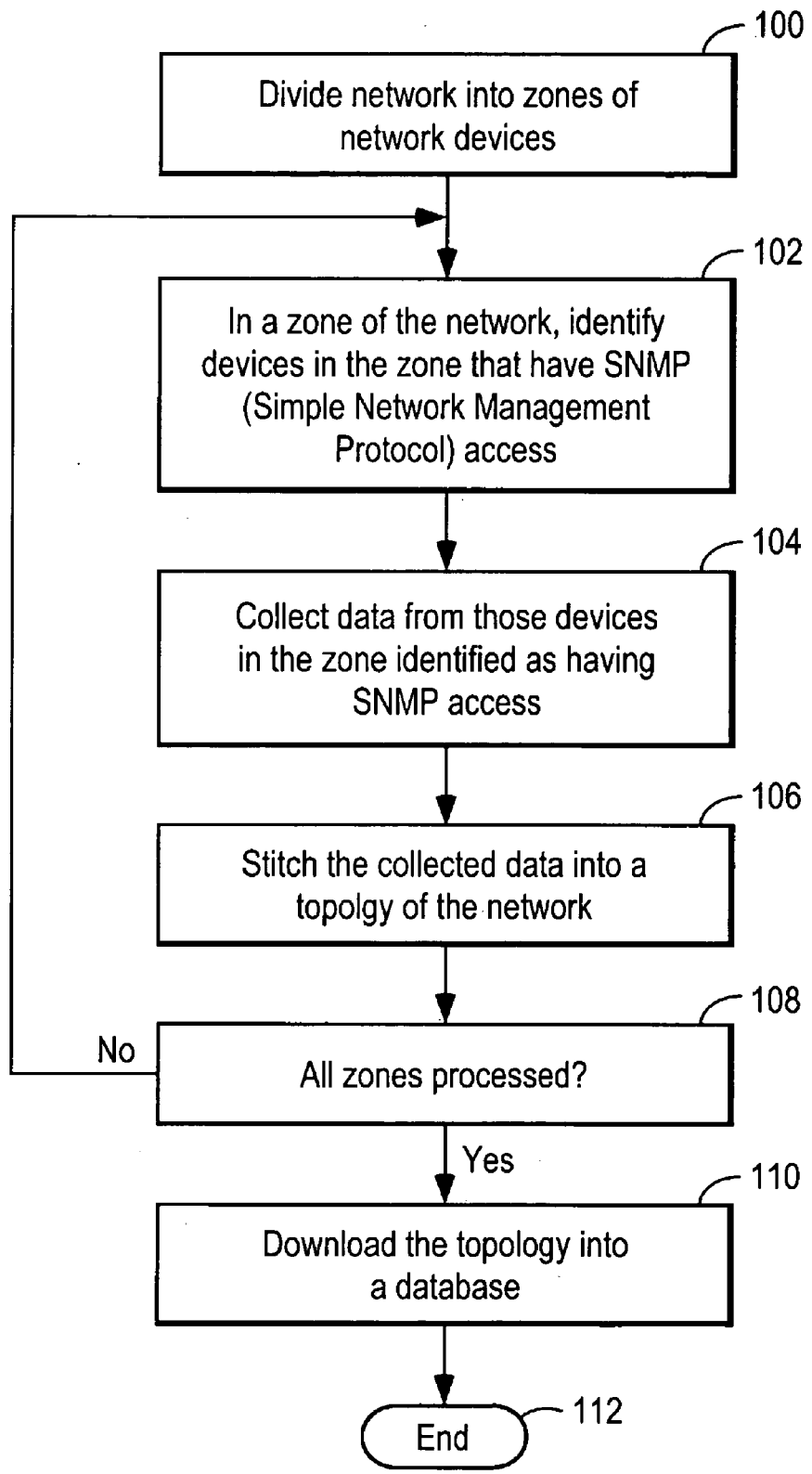
FIG. 1 illustrates a flow diagram in accordance with an exemplary method.

FIG. 1 illustrates an exemplary process for discovering a network, for example a managed network including network devices having SNMP (Simple Network Management Protocol) access. In a first block 100, the network is divided network into zones of network devices. In a next block 102, in a zone of the network, devices in the zone that have SNMP (Simple Network Management Protocol) access are identified. In a next block 104, data are collected from the identified devices, i.e., those devices that were identified as having SNMP access in the zone. In a next block 106, the collected data are stitched into a topology of the network. In a next block 108, a determination is made whether all of the zones in the network have been processed. If no, then control returns to block 102, where the process can be started anew with respect to a different zone of the network. If yes, then control proceeds to block 110, where the topology is downloaded into a database. From block 110, control proceeds to block 112 where the process ends.

The subprocess in block 108 can be performed, for example, by incrementing a number representing a zone identification and processing the corresponding zone, until all zones have been processed. The subprocess in block 104 can be performed using agents, for example agents to which nodes in an identified zone have been dispatched or identified. The agents can collect data from network devices at the dispatched nodes using SNMP, for those nodes having SNMP access. The subprocess of block 100 can be performed, for example, manually by an Administrator (for example via the seed file 210 shown in FIG. 2), and/or by processes variously described in the following copending applications, which are hereby incorporated by reference: a U.S. non-provisional patent application entitled "METHOD AND SYSTEM FOR DETERMINING A NETWORK MANAGEMENT SCALABILITY THRESHOLD OF A NETWORK MANAGER WITH RESPECT TO A NETWORK", filed in the U.S. Patent and Trademark Office on 23 Sep. 2003 and bearing, inventors Gabriel Brandon Wechter, Eric A. Pulsipher, and Max Carl Knees; and a U.S. non-provisional patent application entitled "METHOD AND SYSTEM FOR MANAGING A NETWORK OF NODES", filed in the U.S. Patent and Trademark Office on 23 Sep. 2003 and bearing, inventors Gabriel Brandon Wechter, Eric A. Pulsipher, and Max Carl Knees.

Figure 2:
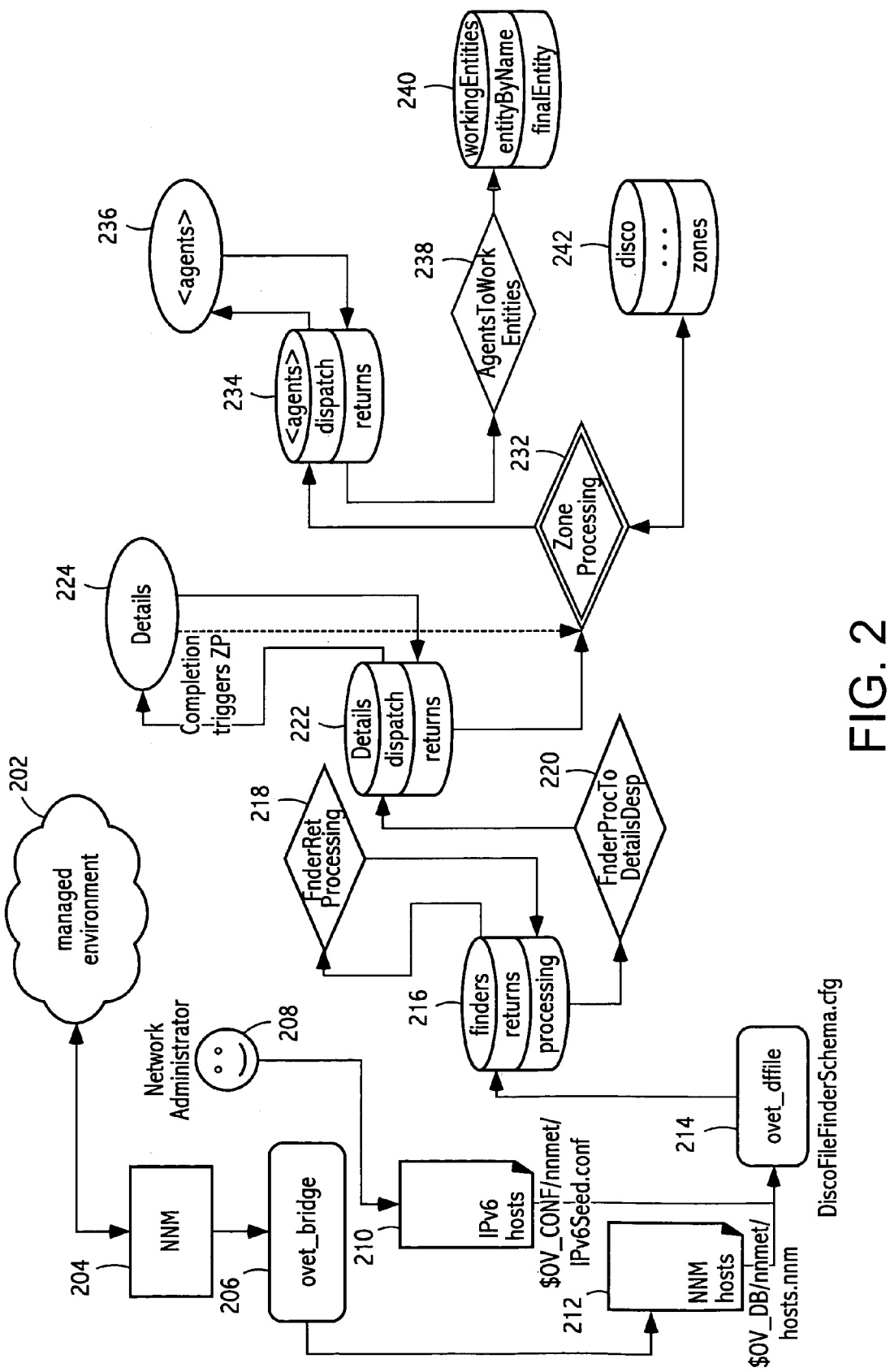
FIG. 2 illustrates a functional diagram in accordance with an exemplary method.

FIG. 2 illustrates discovery of a first zone in a managed network, in accordance with an exemplary embodiment. As shown in FIG. 2, a managed environment or network 202 is connected to or administered to by a software application or module 204 such as Hewlett Packard's Network Node Manager (NNM), which is in turn connected to a software module or application 206 also named "ovet_bridge". The ovet_bridge 206 receives a list or batch of managed nodes of the network 202 from the NNM 204, and publishes it to a module or data element (such as a file) 212, also named "NNM hosts". The data element 212 can include, for example, an IP (Internet Protocol) address and node name on each line. A software module or application or element 214 reads data from the module 204, and inserts nodes into an ovet_disco finders.returns table in a database 216. A network administrator 208 can also provide a seed file or seed data 210 describing nodes in the network 202, to the module 214. An Ovet discovery or "ovet_disco" process 270 includes multiple modules or processes, for example the modules or processes 216, 218, 220, 222, 232, 234, 238, 240 and 242, as shown in FIG. 2 and described herein.

A FinderRetProcessing stitcher 218 is invoked on each insertion to the finder.returns table of the database 216, and moves or inserts the node to a finders.processing portion of the database 216. A FinderProcToDetailsDesp stitcher 220 is invoked on each insertion to the finders.processing portion of the database 216, and moves nodes to a Details.dispatch portion of a database 222. A details agent 224 receives nodes from the Details.dispatch portion of the database 222, and performs a set of SNMP queries (for example, to nodes in the network 202 having SNMP access) for values such as sysDescr and sysObjectID, and inserts values received in response to the queries into a Details.returns portion of the database 222. For example, the details agent 224 can collect or indicate SNMP accessible nodes. In an exemplary embodiment this can increase efficiency of subsequent processing, because non-SNMP nodes can be ignored. When the details agent 224 completes its survey of all nodes, a ZoneProcessing stitcher 232 is invoked.

The ZoneProcessing stitcher 232 uses information from the Details.returns portion of the database 222 to compute a list of zones in the network 202, and dispatches valid nodes (for example, nodes having sysObjectIDs) in the first zone to active agent(s) 236. This is performed using an Agents.dispatch portion or table of a database 234, which is accessed by or transfers information to the agents 236. Agent dispatch table insertions into the Agents.dispatch portion or table of the database 234 can be automatically or transparently rejected if their corresponding sysObjectIDs are not supported by one of the agents 236. The ZoneProcessing stitcher 232 can set a zone count, a zone ID (identification), a "first zone" flag, and an "all zones done" flag in a Disco.zones portion or table of a database 242 before returning. The agent(s) 236 use the data from the Agents.dispatch portion or table of the database 234 to collect data, and the agent(s) 236 populate the collected data into an Agents.returns table or portion of the database 234. The Agents.returns table or portion of the database 234 can act as a cache for this information. An AgentsToWorkEntities stitcher 238 can be activated upon every insertion into the Agent.returns table of the database 234, and can forward data from the insertion to a workingEntities.entityByName portion or table of a database 240. The database 240 can act as a cache for the forwarded data.

The agent(s) 236 can be separate entities or binaries from the ovet_disco process, and can be specific to or can be configured to interact effectively with, the various switches, nodes, and protocols found on or supported within the network 202.

Figure 3:
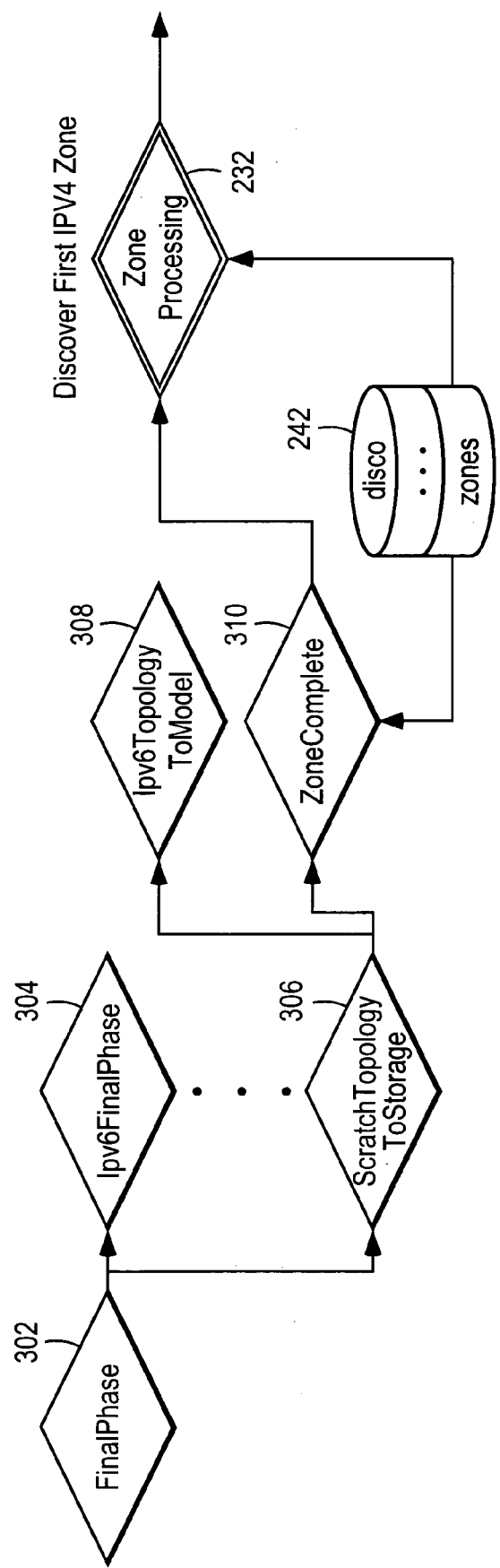
FIG. 3 illustrates a functional diagram in accordance with an exemplary method.

FIG. 3 illustrates an exemplary process with respect to subsequent processing of zones, after the first zone. As shown in FIG. 3, a FinalPhase stitcher 302 is invoked, for example after the agent(s) 236 have completed data collection for a zone. The FinalPhase stitcher connects to multiple stitchers, including an IPv6FinalPhase stitcher 304 and a ScratchTopologyToStorage stitcher 306. The ScratchTopologyToStorage stitcher 306 processes the discovery topology data and downloads a scratchTopology.entityByName table to a master entityByName table, which is managed by an OQL (Object Query Language) adapter. The master entityByName table can act as a cache for this information. The ScratchTopologyToStorage stitcher 306 also transfers data to an IPv6TopologyToModel stitcher 308. The ScratchTopologyToStorage stitcher 306 then invokes a ZoneComplete stitcher 310.

The ZoneComplete stitcher 310, which can be a text stitcher, clears the Agents.dispatch and Agents.returns tables of the database 234, refreshes a topology and layer database (which can be connected, for example, to the ScratchTopologyToStorage stitcher 306), clears SNMP and DNS helper caches, and signals ovet_disco that this zone cycle has been completed. If all zones are not yet done, as indicated for example by the "all zones done" flag in the database 242, then ovet_disco can invoke the ZoneProcessing stitcher 232 to continue the processes shown in FIG. 3 and the processes shown in FIG. 2 with respect to elements 232, 234, 236, 238, 240 and 242 for a next zone. The ZoneProcessing stitcher 232 can increment a zone ID value to indicate a next zone for processing, and then perform the procedures described above.

An exemplary process of identifying devices in the network that have SNMP access can include a first module (e.g., 206) receiving a list of managed nodes in the network and publishing the list of managed nodes to a first file (e.g., 212), a second module (e.g., 214) reading the first file and inserting data from the file into a returns portion of a first database (e.g., 216), invoking a third module (e.g., 218) upon each insertion of data from the first file into the returns portion of the first database, which inserts data from the returns portion of the first database into a processing portion of the first database, invoking a fourth module (e.g., 220) upon each insertion of data into the processing portion of the first database, the fourth module identifying nodes corresponding to the inserted data to a dispatch portion of a second database (e.g., 222), and a details agent (e.g., 224) obtaining node identifications from the dispatch portion of the second database, performing queries to the nodes corresponding to the node identifications, and inserting information received in response to the queries into a returns portion of the second database.

An exemplary process of collecting data from the identified devices includes invoking a fifth module (e.g., 232) which accesses the returns portion of the second database, computes a list of the zones, and dispatches valid nodes in the first zone or the zone currently being processed to active agents (e.g., 236) via a dispatch portion of a third database (e.g., 234), and the agents collecting data from the valid nodes and returning the collected data to a returns portion of the third database.

An exemplary process can also include invoking a sixth module (e.g., 302, 306), which causes the collected data in the returns portion of the third database to be processed into discovery topology data of the network and then downloaded, and invoking a seventh module (e.g., 310), which clears the dispatch and returns portions of the third database and refreshes topology and layer databases and signals that topological analysis with respect to the zone has been completed.

Figure 4:
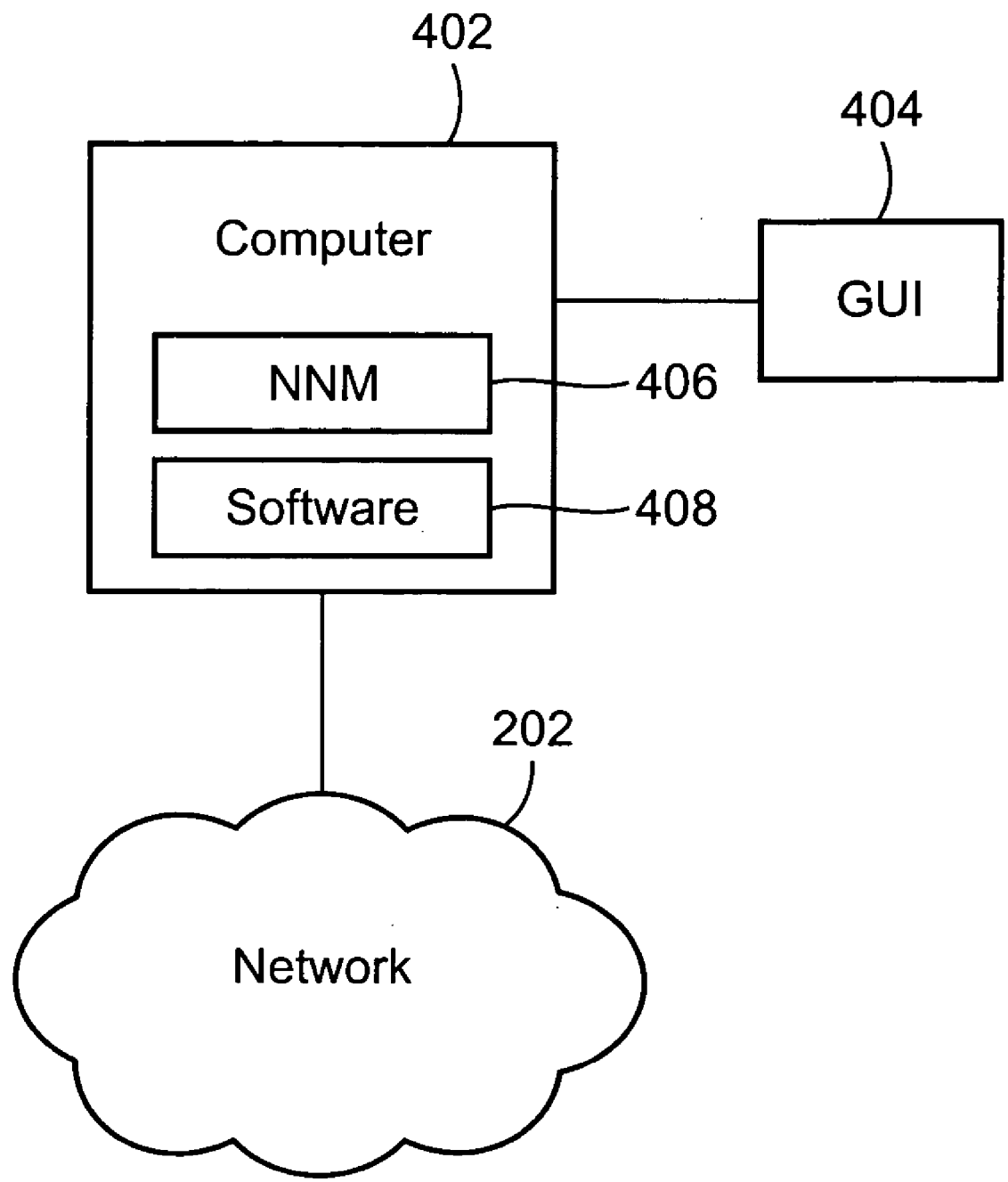
FIG. 4 illustrates a functional diagram in accordance with an exemplary method.

Using and stitching together zones of a network, allows much larger environments to be discovered and managed than situations where an entire network is discovered all at once. A cache management mechanism can also be provided to allow accurate connectivity and to allow logical relationships to be deduced and represented across discoveries of multiple zones. In accordance with exemplary embodiments, a user can specify through a graphical user interface (GUI), for example the GUI 404 shown in FIG. 4, how the network or environment is to be divided into zones, and/or a zone configuration can be obtained via other mechanisms, for example as described in the co-pending applications incorporated herein by reference.

The zone configuration can be used or consumed by the discovery mechanism(s) described herein. When a discovery is initiated, each device in the network can be tested against the zone configuration and then assigned one or more zone identifiers. Each zone can be discovered in turn. A node or device belonging to multiple zones would be a multi-zone device, and can function to link or organize zones. For example, information about multi-zone devices can be used to keep connectivity information about the network current, and can allow switches to be properly grouped into VLAN(s) (Virtual Local Area Network). Discovery algorithms can thus automatically track the zones to which the various entities in the network belong, and can piece together the zones into a topology representing the entire environment. For example, at the end of discovery of each zone, the resulting "scratch topology" can be examined by an algorithm that performs the following:

1 For each object in the scratch topology:
1.1 If the object is a "node entity"
1.1.1 If the node is part of multiple zones
1.1.1.1 Remember the name of this node in a ZoneCache (temporary) database.
1.1.2 If the node has not already been discovered in a previous zone 1.1.2.1 Send the node record to a persistent topology database.
1.2 If the object is an "interface entity" (e.g., a component of a node entity)
1.2.1 If the interface is part of a node in the ZoneCache database AND the interface is directly connected to another node
1.2.1.1 Add the connection information for this interface to the ZoneCache database.
1.2.1.2 Update the existing record in the persistent topology database.
2 At the conclusion of the final zone, write container objects (e.g., VLANs, HSRP (Hot Standby Router Protocol) groups) associated with multiple zones to the persistent topology database and prepare for consumption by downstream applications (e.g., graphical views, path analysis, and event correlation algorithm(s)).

The ZoneCache database can facilitate updating the connections associated with an already-downloaded node, for example a multi-zone node.

Those skilled in the art will also appreciate that the elements and methods or processes described herein can be implemented using a microprocessor, computer, or any other computing device, and can be implemented in hardware and/or software, in a single physical location or in distributed fashion among various locations or host computing platforms. The agents can be implemented in hardware and/or software at any desired or appropriate location. For example, FIG. 4 also shows a computer 402 connected to the GUI 404 and to the network 202, as well as software 408 and NNM software 406 operating on the computer 402. The software 408 can include modules for performing the processes shown in FIGS. 1-3.

The processes and mechanisms described herein, for example with respect to FIGS. 1-3, can be implemented individually or collectively on the computer 402, which can be implemented using a microprocessor, computer, or any other computing device, and can be implemented in a single physical location or in distributed fashion among various locations or host computing platforms. Agents such as the agents 224, 236, and stitchers such as the stitchers 218, 220, 232, 238, 302, 304, 306, 308, and 310 can be implemented in hardware and/or software at any desired or appropriate location. The computer 402 can also include data transfer or input/output devices of various kinds, including a keyboard, and one or more connections to computing resources (data and/or processing) external to the computer 402. The various databases shown in FIGS. 2-3 can be implemented as memory within the computer 402 or accessible to the computer 402, for example as Random Access Memory (RAM), one or more hard drives located locally and/or in distributed fashion through a network or internet, or any data storage medium or mechanism.

An exemplary system for discovering a network organized into zones of network devices, includes means (for example, the computer 402 with software 406, 408) for identifying devices in a zone of the network that have SNMP (Simple Network Management Protocol) access, collecting data from those devices in the zone identified as having SNMP access, and stitching the collected data into a topology of the network, and means for transferring data to and from the means for identifying, collecting and stitching (for example, the GUI 404 or another other data transfer mechanism, interface, etc.). The means for caching data can be implemented via RAM within the computer 402 or accessible to the computer 402, and/or via one or more hard drives located locally and/or in distributed fashion through a network or internet, or via any data storage medium or mechanism.

It will also be appreciated by those skilled in the art that the present invention can be embodied in other specific forms without departing from the spirit or essential characteristics thereof, and that the invention is not limited to the specific embodiments described herein. The presently disclosed embodiments are therefore considered in all respects to be illustrative and not restrictive. The scope of the invention is indicated by the appended claims rather than the foregoing description, and all changes that come within the meaning and range and equivalents thereof are intended to be embraced therein.

The invention claimed is:

1. A method for discovering a network comprising network devices, the method comprising:
   dividing the network into zones of network devices;
   in a first zone of the network, identifying devices in the first zone that have SNMP (Simple Network Management Protocol) access through a set of queries;
   collecting data from the identified devices; and
   stitching the collected data into a topology of the network.

2. The method of claim 1, comprising:
   repeating the steps of identifying, collecting and stitching for each of the zones in the network.

3. The method of claim 1, comprising:
   dispatching the identified devices in the first zone to agents; and
   collecting the data from the identified devices via the agents using the SNMP access.

4. The method of claim 3, comprising:
   caching the collected data; and
   downloading the topology into a database.

5. The method of claim 1, wherein the process of identifying comprises:
   a first module receiving a list of managed nodes in the network and publishing the list of managed nodes to a first file;
   a second module reading the first file and inserting data from the first file into a returns portion of a first database;
   invoking a third module upon each insertion of data from the first file into the returns portion of the first database, which inserts the data from the returns portion of the first database into a processing portion of the first database;
   invoking a fourth module upon each insertion of data into the processing portion of the first database, the fourth module identifying nodes corresponding to the inserted data to a dispatch portion of a second database; and
   a details agent obtaining the node identifications from the dispatch portion of the second database, performing queries to the nodes corresponding to the node identifications, and inserting information received in response to the queries into a returns portion of the second database.

6. The method of claim 5, wherein the process of collecting comprises:
   invoking a fifth module, which accesses the returns portion of the second database, computes a list of the zones, and dispatches valid nodes in the first zone to active agents via a dispatch portion of a third database,
   wherein the agents collect data from the valid nodes and return the collected data to a returns portion of the third database.

7. The method of claim 6, comprising:
invoking a sixth module, which causes the collected data in the returns portion of the third database to be processed into discovery topology data of the network and then downloaded; and
invoking a seventh module, which clears the dispatch and returns portions of the third database and refreshes topology and layer databases and signals that topological analysis with respect to the zone has been completed.

8. A system for discovering a network organized into zones of network devices, comprising:
means for identifying devices in a zone of the network that have SNMP (Simple Network Management Protocol) access through a set of queries, collecting data from those devices in the zone identified as having SNMP access, and stitching the collected data into a topology of the network; and
means for transferring data to and from the means for identifying, collecting and stitching.

9. The system of claim 8, wherein:
the means for transferring comprises a Graphical User Interface; and
the system comprises means for caching data.

10. The system of claim 8, wherein the means for identifying, collecting and stitching repeats the identifying, collecting and stitching for each zone in the network.

11. A machine readable medium comprising a computer program for causing a computer to execute a method of discovering a network, the method comprising:
dividing the network into zones of network devices;
in a first zone of the network, identifying devices in the zone that have SNMP (Simple Network Management Protocol) access;
collecting data from the identified devices; and
stitching the collected data into a topology of the network.

12. The medium of claim 11, wherein the computer program causes the computer to perform:
repeating the steps of identifying, collecting and stitching for each of the zones in the network.

13. The medium of claim 11, wherein the computer program causes the computer to perform:
dispatching identified devices in the zone to agents; and
collecting the data from the identified devices via the agents using the SNMP access.

14. The medium of claim 11, wherein the computer program causes the computer to perform:
caching the collected data; and
downloading the topology into a database.

15. The medium of claim 11, wherein the computer program includes first, second, third and fourth modules and a details agent, and causes the computer to perform:
the first module receiving a list of managed nodes in the network and publishing the list of managed nodes to a first file;
the second module reading the first file and inserting data from the first file into a returns portion of a first database;
invoking the third module upon each said insertion of data from the first file into the returns portion of the first database, which inserts the data from the returns portion of the first database into a processing portion of the first database;
invoking the fourth module upon each said insertion of data into the processing portion of the first database, the fourth module identifying nodes corresponding to the inserted data to a dispatch portion of a second database; and
the details agent obtaining node identifications from the dispatch portion of the second database, performing queries to the nodes corresponding to the node identifications, and inserting information received in response to the queries into a returns portion of the second database.

16. The medium of claim 15, wherein the computer program includes a fifth module and causes the computer to perform:
invoking the fifth module, which accesses the returns portion of the second database, computes a list of the zones, and dispatches valid nodes in the first zone to active agents via a dispatch portion of a third database,
wherein the active agents collect data from the valid nodes and return the collected data to a returns portion of the third database.

17. The medium of claim 16, wherein the computer program includes sixth and seventh modules and causes the computer to perform:
invoking the sixth module, which causes the collected data in the returns portion of the third database to be processed into discovery topology data of the network and then downloaded; and
invoking the seventh module, which clears the dispatch and returns portions of the third database and refreshes topology and layer databases and signals that topological analysis with respect to the zone has been completed.

* * * * *

UNITED STATES PATENT AND TRADEMARK OFFICE
CERTIFICATE OF CORRECTION

PATENT NO. : 8,005,932 B2  
APPLICATION NO. : 10/716605  
DATED : August 23, 2011  
INVENTOR(S) : Max C. Knees et al.

It is certified that error appears in the above-identified patent and that said Letters Patent is hereby corrected as shown below:

In column 2, line 22, delete "bearing, inventors" and
insert -- bearing Application No. 10/667,862, inventors --, therefor.

In column 2, line 27, delete "bearing, inventors" and
insert -- bearing Application No. 10/667,332, inventors --, therefor.

Signed and Sealed this
Twentieth Day of March, 2012

David J. Kappos
*Director of the United States Patent and Trademark Office*